No. 690,596. Patented Jan. 7, 1902.
A. W. MATHEWSON.
RAILWAY HEAD OR OTHER SIMILAR FIBER DRAWING MACHINE.
(Application filed Oct. 20, 1900.)
(No Model.) 6 Sheets—Sheet 1.
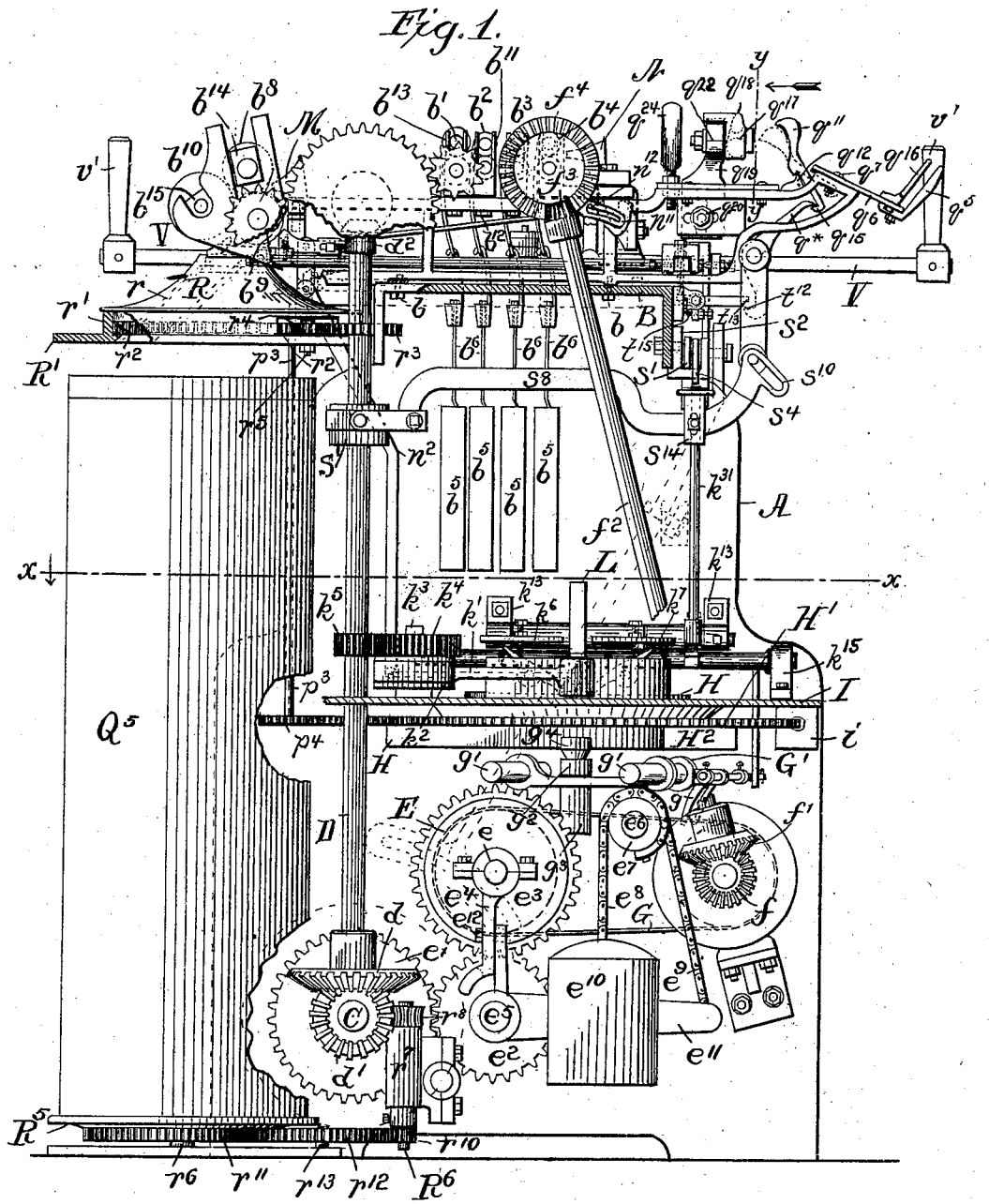
WITNESSES:
INVENTOR
Arthur W. Mathewson,
BY
ATTORNEY.

No. 690,596. Patented Jan. 7, 1902.
A. W. MATHEWSON.
RAILWAY HEAD OR OTHER SIMILAR FIBER DRAWING MACHINE.
(Application filed Oct. 20, 1900.)
(No Model.) 6 Sheets—Sheet 2.
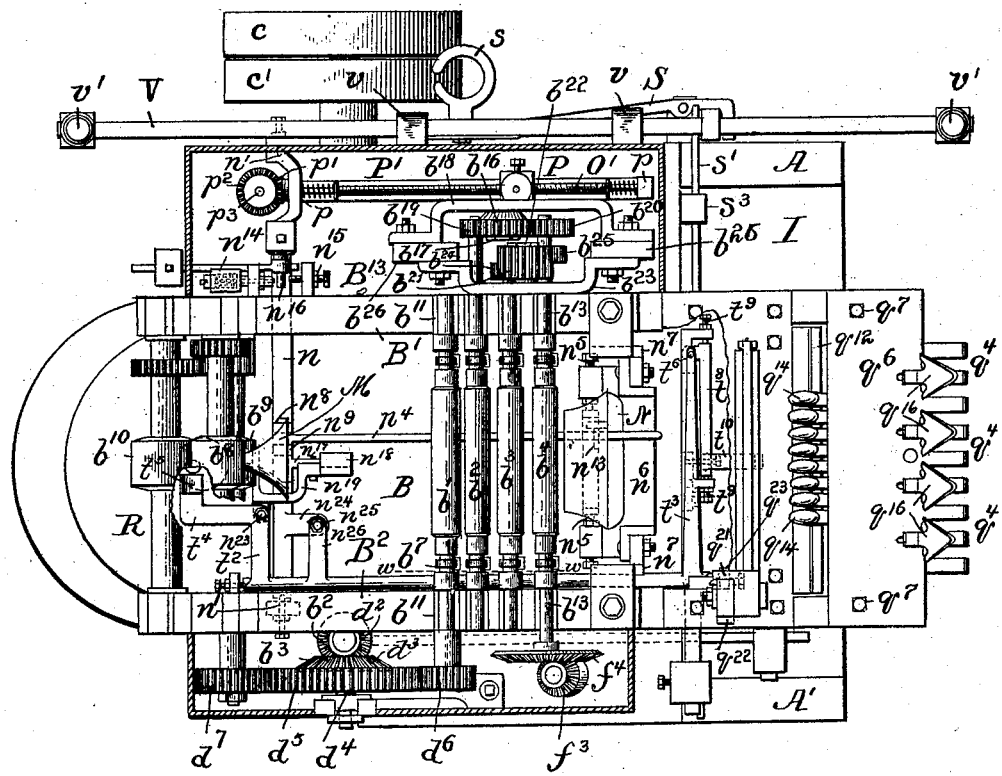
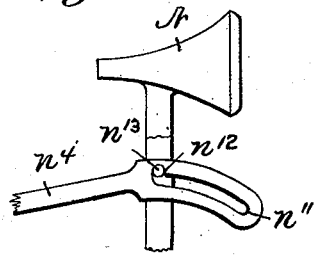
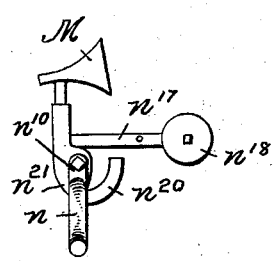
WITNESSES:
INVENTOR
Arthur W. Mathewson,
BY
ATTORNEY.

No. 690,596. Patented Jan. 7, 1902.
A. W. MATHEWSON.
RAILWAY HEAD OR OTHER SIMILAR FIBER DRAWING MACHINE.
(Application filed Oct. 20, 1900.)
(No Model.) 6 Sheets—Sheet 3.
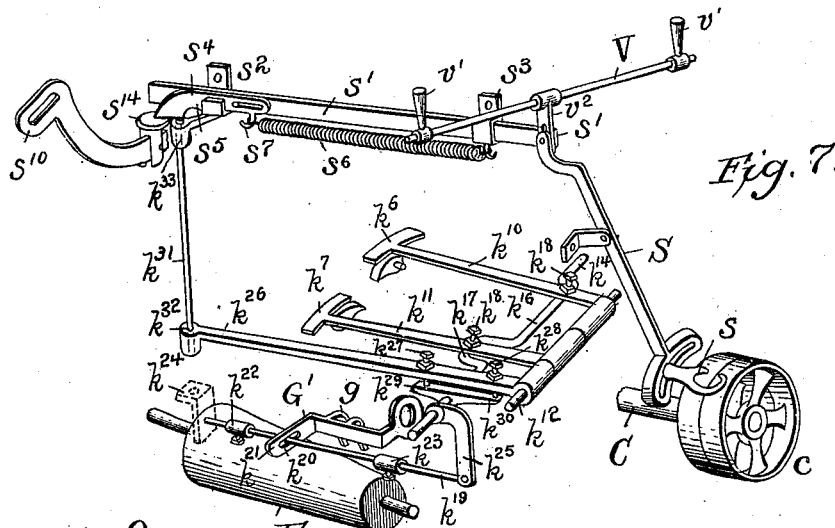
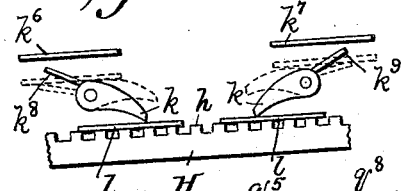
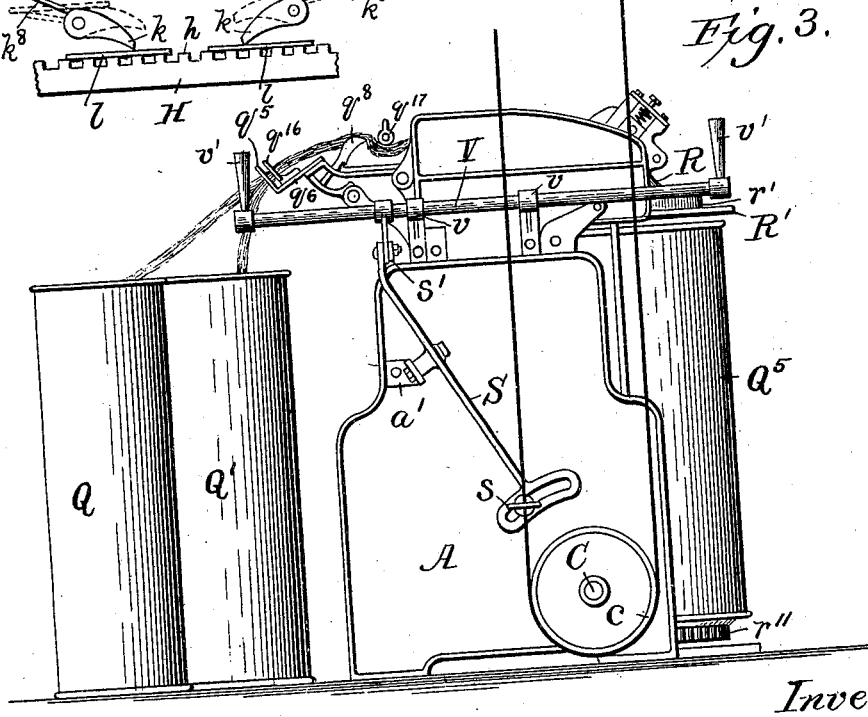
Witnesses:
J. B. McGirr.
A. F. Sweeny.
Inventor:
Arthur W. Mathewson
By Appleton,
Attorney.
THE NORRIS PETERS CO., PHOTO-LITHO., WASHINGTON, D. C.

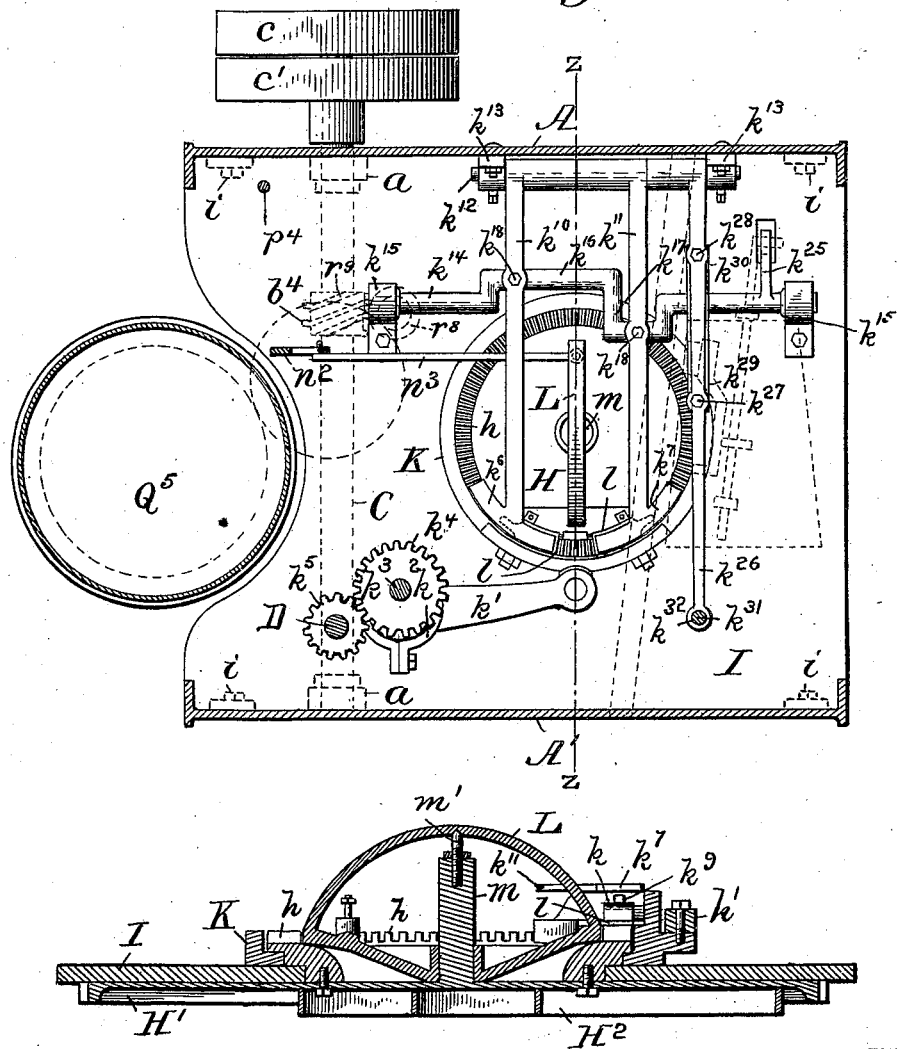

No. 690,596. Patented Jan. 7, 1902.
A. W. MATHEWSON.
RAILWAY HEAD OR OTHER SIMILAR FIBER DRAWING MACHINE.
(Application filed Oct. 20, 1900.)
(No Model.) 6 Sheets—Sheet 5.
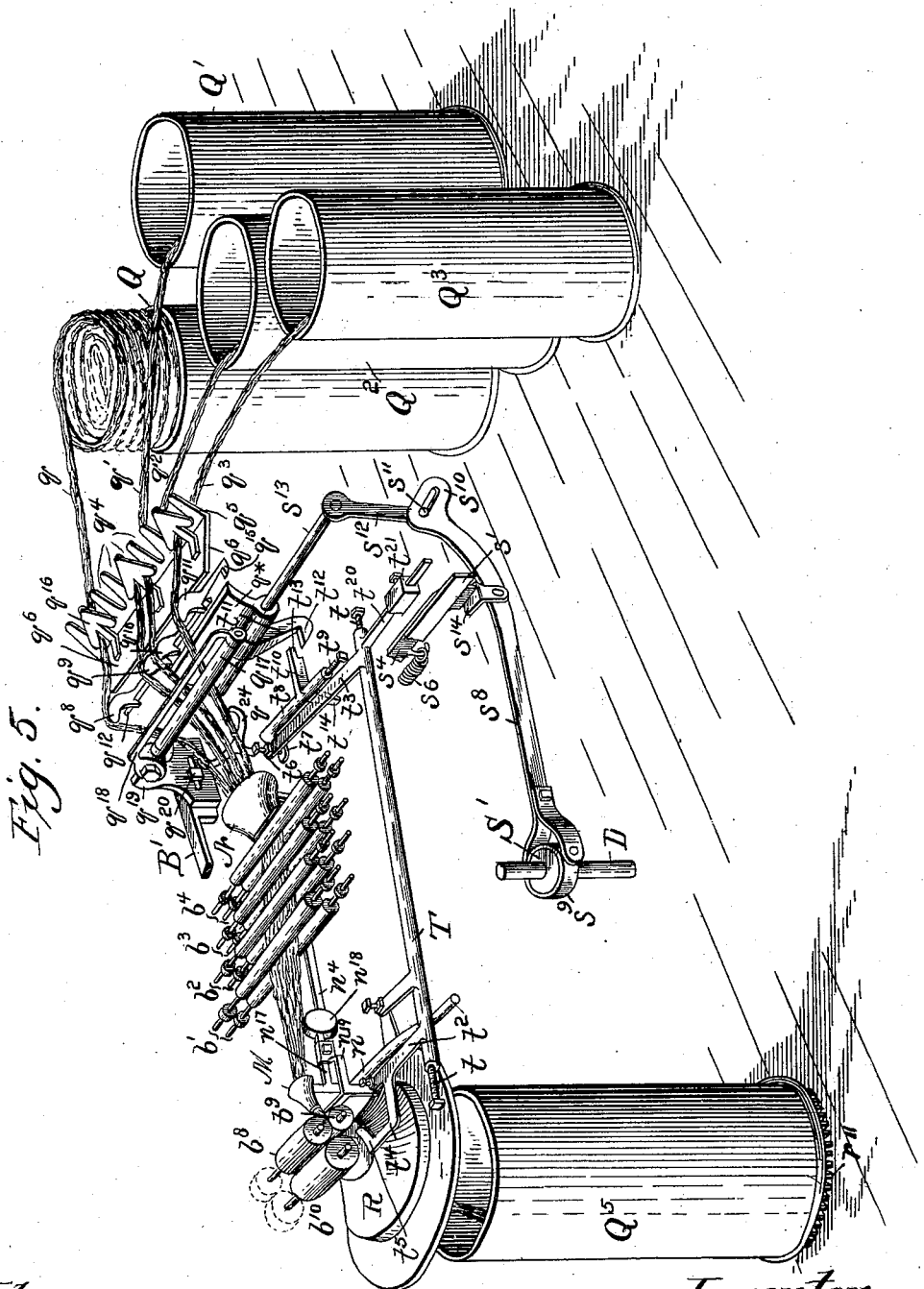

No. 690,596. Patented Jan. 7, 1902.
A. W. MATHEWSON.
RAILWAY HEAD OR OTHER SIMILAR FIBER DRAWING MACHINE.
(Application filed Oct. 20, 1900.)
(No Model.) 6 Sheets—Sheet 6.
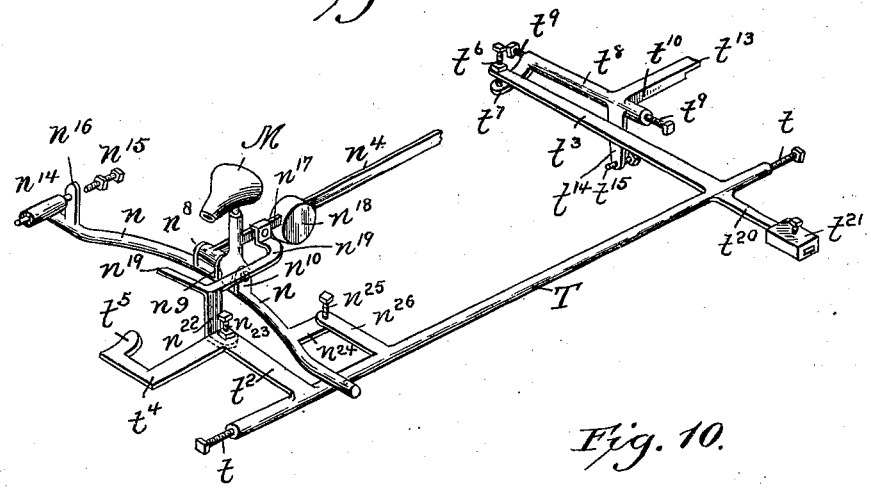
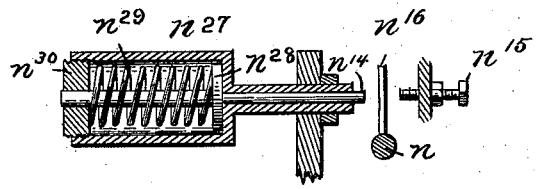
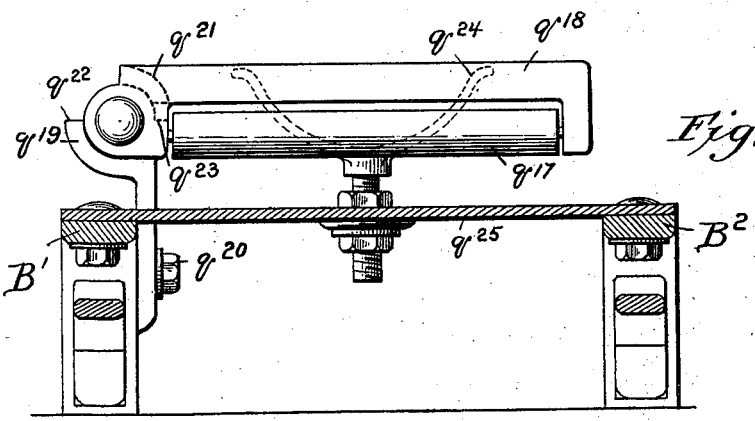

UNITED STATES PATENT OFFICE.

ARTHUR W. MATHEWSON, OF LEWISTON, MAINE.

RAILWAY-HEAD OR OTHER SIMILAR FIBER-DRAWING MACHINE.

SPECIFICATION forming part of Letters Patent No. 690,596, dated January 7, 1902.

Application filed October 20, 1900. Serial No. 33,665. (No model.)

*To all whom it may concern:*

Be it known that I, ARTHUR W. MATHEWSON, a citizen of the United States, and a resident of Lewiston, in the county of Androscoggin and State of Maine, have invented certain new and useful Improvements in Railway-Heads or other Similar Fiber-Drawing Machines, of which the following is a specification.

My invention while designed more especially as an improvement upon the machine shown and described in United States Letters Patent No. 655,934, which were granted August 14, 1900, is applicable in whole or in part to various of the other forms of machine that are employed in the transformation of cotton fiber into yarn, its object being to increase the efficiency of these machines and to not only prevent the breaking of parts when the evener belt-shifter has reached the limit of its movement in either direction, but also to provide for the automatic stoppage of the machine whenever one or more of the slivers supplied thereto breaks or break or otherwise fails or fail, when the sliver-receiving can is filled beyond a certain limit, or when the proper travel of the sliver through the front trumpet or from the calender-rolls to such receiving-can is interrupted.

To these ends the invention consists, first, in the means whereby the material to be treated is properly guided to the machine and the stopping of the latter effected when the former breaks or otherwise fails in whole or in part; second, in the means by which the movements of the evener mechanism are arrested and the stoppage of the machine effected when the evener-mechanism belt-shifter reaches the limit of its travel in either direction; third, in the means by which the stoppage of the machine is accomplished when the sliver-receiving can is filled beyond a certain limit; fourth, in the means whereby the stoppage of the machine is effected when the sliver in traveling from the calender-rolls to the receiving-can becomes clogged in the coiler or fails to enter the same; fifth, in the means by which the stoppage of the machine is effected when the sliver instead of traveling properly from the calender-rolls through the coiler winds around the under of such rolls; sixth, in the means whereby the stoppage of the machine is accomplished when the sliver breaks in rear of the front trumpet or the sliver becomes reduced in size below a certain limit; seventh, in the means by which the stoppage of the machine is accomplished when this trumpet becomes choked by a bunch or other enlargement of the sliver passing through it, and, eighth, in various other mechanisms and combinations of parts, all as will hereinafter more fully appear.

Referring to the accompanying drawings, which form a part of this specification, Figure 1 is a sectional side elevation of a machine constructed in accordance with my invention, certain of the parts being omitted and others broken away for convenience of illustration; Fig. 2, a sectional plan thereof with certain of the parts shown in section and others similarly broken away for a like reason; Fig. 3, a side elevation of the machine, taken from the opposite side from that illustrated in Fig. 1 and showing a number of sliver-containing cans; Fig. 4, a horizontal sectional plan taken in the plane $x$ $x$ of Fig. 1; Fig. 5, a detached isometric projection of certain of the parts, comprising, among other things, the feed-rolls, the calender-rolls, the devices for conducting the material through the machine, and a portion of the stopping devices with various sliver containing and receiving cans; Fig. 6, a like detached isometric projection of the front trumpet and of the supporting-shaft and counterbalancing-weight with certain of the parts composing the stopping mechanism; Fig. 7, a similar detached isometric projection of the evener belt-shifter, the cone-drum, the evener-ratchet-operating pawls, the fast and loose pulleys, and the belt-shipping devices with certain of the parts by means of which the shipping devices are automatically operated to stop the machine and remove the pawls from engagement with the evener-ratchet when the evener belt-shifter has traversed beyond certain limits in either direction; Fig. 8, a detached side elevation of the front trumpet and its supporting devices and weight with the shaft upon which they are mounted; Fig. 9, a detached elevation of a portion of the evener-mechanism ratchet and its actuating-pawls, with an edge view of the shields and of the lifting-plates by means of which the pawls are removed and held from engagement with the ratchet; Fig. 10, a sectional elevation of the front-trumpet-supporting shaft with the fixed and yielding stops by means of which the oscillatory movements of the shaft, and with it the trumpet, are limited; Fig. 11, a transverse sectional detail taken in the plane $y\ y$ of Fig. 1 and looking in the direction of the arrow; Fig. 12, a sectional side elevation of the pawl-shield-supporting frame and of the parts cooperating therewith, taken in the plane $z\ z$ of Fig. 4; Fig. 13, a sectional detail showing the top drawing-rolls and portions of the connecting-rods by means of which the weights are suspended, taken in the plane $w\ w$ of Fig. 2; and Fig. 14 a detail side elevation of a portion of the rear trumpet and a portion of the rod by means of which it is connected with the front trumpet.

In all figures like letters of reference are employed to designate corresponding parts.

A A' indicate end frames or standards, which are tied together and held at the proper distance apart by a plate or top B, that is secured between or upon their upper portions by screws or otherwise and extending across from one to the other constitutes therewith the main housing of the machine. In the construction of these end frames or standards any appropriate material may be employed and any approved design adopted. I prefer, however, to construct them of metal and of the general form shown and to provide them in their lower portions with bearings $a$, in which is journaled the main driving-shaft C, that is equipped at one of its ends with a fast pulley $c$ and a loose pulley $c'$.

B' B² indicate stands, which are secured to the upper surface of the top B by appropriate screws $b$ or other equivalent means and, extending transversely across the same from front to rear in parallel relationship to each other, support the drawing and calender rolls, by means of which the material passing through the machine is attenuated and delivered. These drawing-rolls are composed of top and bottom rolls, which are arranged in pairs, with a top and bottom roll in each, and the number of these pairs may be varied to suit them to the requirements of the particular machine. In the drawings, however, I have shown four of these pairs, of which $b'$ indicates the front pair and $b^2$, $b^3$, and $b^4$ the back pairs, which latter are successively arranged the one behind the other in an unbroken series in rear of the front pair, with the top roll of each pressed against its respective bottom roll by a weight $b^5$, which is suspended therefrom by a connecting-rod $b^6$, that is provided with an overhanging bearing $b^7$ at its upper end. The calender-rolls, on the other hand, are composed of a top roll $b^8$, a bottom roll $b^9$, and a front roll $b^{10}$, which in practice are held in contact by pressure, with the top roll arranged above the bottom roll and the front roll disposed in front of and between the two former and coöperating with both. As thus arranged the drawing-rolls are supported by the stands B' B² through the intermediaries of bearing-blocks $b^{11}$, which are adjustably secured to the latter by appropriate screws $b^{12}$ and are severally provided with suitable bearings $b^{13}$, in which their respective pairs of rolls are journaled, while the calender-rolls are supported by such stands in suitable bearings $b^{14}$ and $b^{15}$, with which the forward ends of the latter are severally provided. By this arrangement, as will be seen, not only are the drawing and calender rolls supported above the top B in the proper relative positions with respect to one another, but the adjustment of the drawing-rolls to suit them to the treatment of fibers of different lengths is also permitted.

With the various rolls supported and arranged as above described the front drawing-rolls $b'$ and the calender-rolls $b^8$, $b^9$, and $b^{10}$ are preferably operated from the main driving-shaft C through positive connections, whereby to insure of a positive and uniform speed of rotation being imparted to them therefrom under all conditions. To this end I make use of the upright shaft D, which, mounted in suitable bearings secured to or formed on the main housings or other convenient parts of the machine, is provided at its lower end with the bevel-gear $d$, that intermeshes with a corresponding bevel-gear $d'$, secured to the shaft C, and also at its upper end with a bevel-gear $d^2$, that intermeshes with a bevel-gear $d^3$, which is rotatively mounted upon a supporting-stud $d^4$, with a spur-gear $d^5$ fixedly secured to its side and intermeshing with the spur-gears $d^6$ and $d^7$, with which the bottom of the front pair of drawing-rolls $b'$ and of the calender-rolls are respectively provided. The back drawing-rolls $b^2\ b^3\ b^4$, on the other hand, while receiving motion from the main driving-shaft C, are connected and arranged to have their speed of rotation varied relatively to the speed of rotation of the front drawing-rolls and calender-rolls whenever the quantity of material passing through the machine varies, and hence requires a variation in the drawing action to insure the production of a sliver of uniform size and weight throughout. For effecting this variation in the relative speed of these rolls automatically I make use of a peculiarly-constructed evener mechanism, which will now be described.

E indicates a cylindrical drum, which is rotatively mounted in or on suitable bearings $e$ and is driven at a uniform rate of speed from the main driving-shaft, according to the speed of the latter, by means of the train of gears $e'\ e^2\ e^3$, as shown in Fig. 1.

F indicates a conical drum, which is mounted to turn in suitable bearings secured to the housings or other convenient part of the machine and is provided on one end of its supporting-shaft with a bevel-gear $f$, that intermeshes with a second bevel-gear $f'$, secured to the lower end of an upright shaft $f^2$, which in turn is provided at its upper end with a bevel-gear $f^3$, that intermeshes with a corresponding bevel-gear $f^4$ preferably secured to the end of the bottom drawing-roll of the extreme back pair $b^4$, to which the material passing through the machine is delivered.

The cylindrical drum E and conical drum F are connected by an endless belt G, and as the drum F is operated by the drum E through the belt the speed of the drum F relatively to that of the drum E and the speed of the back pairs of drawing-rolls relatively to the speed of the front pair and the calender-rolls will depend, as is obvious, upon the position of the endless belt G longitudinally upon these drums. The speed of the back drawing-rolls being thus dependent upon the position occupied by the belt G along the drums E and F any required variation in the speed of the back rolls relatively to the speed of the front drawing-rolls may be effected by simply shifting this belt longitudinally thereon. For effecting this shifting operation I make use of a shifter G', which, provided with a suitable fork or spanner $g$ for engagement with the belt, is fitted to slide upon the diagonally-arranged guide-rods $g'$ and is moved back and forth thereon from the shaft D. To permit of this being accomplished, I make use of the wheel H, which is provided on its upper side, around its outer edge, with radially-disposed ratchet-teeth $h$, and on its under side with a hub that extends downwardly through and is fitted to rotate in a suitable orifice formed in the horizontally-disposed plate-like shield or deck I, which extends across the machine from one of its end frames or standards to the other and is secured at its ends to the latter by appropriate screws $i$ or otherwise, as may be preferred. To the lower end of the hub of this wheel H as thus arranged and beneath the shield or deck I is fixedly attached a spur-gear H', that has secured to or formed upon its under side a volute-shaped cam-flange $H^2$, while rotatively fitted around the upper portion of this wheel and resting upon the upper surface of the shield or deck I is an annulus K, which, provided with reversely-arranged pawls $k$, that are pivoted thereto for engagement with the teeth $h$, is connected through the instrumentality of a connecting-rod $k'$ with an eccentric $k^2$, which, journaled upon a suitable stud $k^3$, extending upward from the shield or deck I, is connected with the upright shaft D through the gears $k^4$ and $k^5$, with which they are respectively provided. With the parts arranged as thus described an intermittent rotation in one or the other direction is imparted to the wheel H when the shaft D is rotated, as one or the other of the pawls $k$ is engaged with the teeth $h$ and a movement corresponding thereto imparted to the shifter and belt therefrom through the intervention of the volute-shaped cam-flange $H^2$, to which the shifter is operatively connected by the yoke $g^2$, that is fitted to rotate in a suitable socket $g^3$, formed in the frame of the shifter, and is provided at its upper end with the friction-rolls $g^4$, which are disposed on opposite sides of and in contact with such flange, as shown.

For holding either or both of the pawls $k$ out of engagement with the teeth $h$ of the ratchet-wheel H when the wheel, and with it the shifter G', is to remain stationary and permit of their engagement therewith when the wheel is to be rotated in either direction and the shifter moved I make use of the segmentally-shaped shields $l$, one for each pawl, which, constructed in the form of plates, are arranged to extend between the pawls and the teeth $h$. These shields are preferably connected or formed integrally with a frame L, which, suitably journaled upon a stud $m$, that extends upwardly from the gear H', is provided with a curved or arched portion which rests upon and supports the frame from a center $m'$, secured in and extending from said stud, as best shown in Figs. 1 and 12. As thus supported and arranged this frame L is capable of an oscillatory motion upon and around its supporting-stud $m$ independently of the gear H'. When the frame L is in its normal position—as, for instance, when the material passing through the machine is of the proper size to make a sliver of the required cross-section and weight—the shields will be held beneath the pawls $k$ $k$, and in these positions the latter will be compelled to ride in their short backward and forward movements upon the upper surfaces of the former and their engagement with the teeth $h$ of the ratchet H thereby prevented. When, on the other hand, the material passing through the machine is above or below the required size and weight, then the frame L will be swung in the required direction upon its supporting-stud $m$ to bring the appropriate shield from under a portion of the back-and-forth travel of its coöperating pawl, allowing such pawl to drop down into engagement with the proper tooth of the ratchet-wheel H to cause this wheel, and through it the gear H', the flange $H^2$, and the belt-shifter G', to move in the required direction to properly regulate the speeds of rotation of the back drawing-rolls to produce a sliver of the standard size. It will thus be evident that in order to control or regulate the engagement of the pawls with the teeth all that is necessary is to effect the movements of the shields in such manner as to move them more or less from under one or the other of the pawls, and this is accomplished by simply swinging the frame L upon its pivot at the required time and in the required direction.

To accomplish the swinging movements of the frame L automatically, as the requirements of the material passing through the machine may demand, various means may be employed. I prefer, however, to make use of the material-guiding trumpets M and N for the purpose, as thereby I am enabled to avail of the variations in the size and weight of the material to effect the required movements both before and after such material passes the drawing-rolls. When this form of mechanism is employed, the trumpet M is preferably arranged in rear of the calender-rolls $b^8$ and $b^9$, being supported in that position from a shaft $n$, which, rotatively mounted upon centers $n'$, that are adjustably carried by the housings or other convenient parts of the machine, is connected with the frame L through the intermediaries of an arm $n^2$ and connecting-rod $n^3$, as shown in Fig. 4. The trumpet N, on the other hand, is disposed in rear of the back drawing-rolls and connected with the shaft $n$ by the rod $n^4$, whereby to move in unison therewith, it is supported upon centers $n^5$, that are adjustably secured in a carrier $n^6$, which is rigidly fastened to and vertically adjustable on the lower ends of depending hangers $n^7$, that in turn are secured to and adjustable longitudinally of the stands B' B². By this arrangement, as will be seen, not only will any swinging or tilting movements of either of the trumpets toward or away from its respective coöperating rolls be communicated through the shaft $n$, arm $n^2$, and connecting-rod $n^3$ to the frame L and the particular pawl $k$ answering thereto brought into or carried out of engagement with the teeth $h$ of the ratchet H, as the requirements of that movement may demand, but any desired adjustment of the rear trumpet N in a lateral, vertical, or forward or backward direction may be imparted thereto, and in order to provide for the disengagement of the trumpet N from the shaft $n$, whereby to permit of the former being swung backward from and upward toward its coöperating rolls independently of the latter, as is sometimes required in threading the material therethrough in "piecing up the end," as it is sometimes termed, the rod $n^4$ is jointed at its forward end to the shaft $n$ through the intervention of suitable lugs $n^8$ and $n^9$, projecting upward from such shaft, and is provided at its rear end with a plate-like extension in which is formed a slot $n^{11}$, that is equipped in the upper side of its forward end with a recess $n^{12}$ for engagement with a pin or stud $n^{13}$, secured to and extending laterally from the trumpet N, as shown. When in its normal position, the pin or stud $n^{13}$ is engaged with the recess $n^{12}$, and the trumpet N is then connected with the shaft $n$ and caused to move in unison therewith. On the other hand, when the pin or stud is removed from engagement therewith, which may be accomplished by simply raising the rear end of the rod $n^4$, the trumpet N is disconnected from that shaft and may then be swung backward from or forward toward the drawing-rolls, as desired. The trumpets M and N being thus arranged and connected are preferably held in their normal intermediate position or that occupied by them when the material passing through them is of the required size by the conjoint action of the material itself and a counterbalancing-weight P, which, supported upon an arm P', is fixedly secured to the shaft $n$, permits of their tilting forward toward their respective coöperating rolls when the size of the material passing through either of them is increased in size beyond a certain limit, and causes them to tilt backward in an opposite direction away from such rolls when the size of the material passing through either is reduced below the required standard, being limited in these movements by the stops $n^{14}$ and $n^{15}$, with which an upwardly-extending arm $n^{16}$, fixedly secured to the shaft $n$, coöperates. As a result of these conditions and of the connection of the trumpets with the shields $l$ when the trumpets are held in their normal position by the action of the counterbalancing-weight P and the material passing through them the shields will be similarly held in central position with respect to their limits of travel, and neither of the pawls $k$ will be allowed thereby to engage with the teeth $h$ of the ratchet-wheel H. On the other hand, when the trumpets are tilted from these normal positions either toward or away from their respective coöperating rolls by any increase or decrease in the size and weight of the material passing through either of them then by such movement the shields $l$ will be moved around over the wheel H in one or the other direction and the appropriate pawl $k$ will be brought into engagement with the teeth $h$ to move such wheel in the required direction. The size and weight of the material having been restored to the standard, the trumpets will be returned to their normal positions, carrying with them the shields $l$, the effect of which will be to withdraw the pawl from engagement with the teeth of the ratchet-wheel H, and thereby render them inoperative for the time being. In these positions the parts will remain until a further variation in the size and weight of the material passing through the machine occurs, when a further tilting movement of the trumpets will be caused and the movement of parts above specified repeated, and so on, the variation in the size and weight of the material passing through the railway-head by its operation upon either of the trumpets thus controlling the movements of the shields $l$, and hence the movements of the shifter G'. When but a single trumpet is used in rear of the calender-rolls, as M, the counterbalancing-weight P may be fixedly secured in its proper adjusted position upon the arm P' by a set-screw or other convenient means when the position is once determined. When, on the other hand, a second trumpet is employed in rear of the drawing-rolls, then it is necessary that the counterbalancing-weight P should be automatically adjustable along the arm P'; otherwise the trumpet after it had been tilted from its normal position by any variation in the size of the material passing to it would, if the variation continued, remain in the tilted position and the evener mechanism set into operation thereby continued in action to change the size of the sliver in an opposite direction, notwithstanding the fact that the sliver might be of the proper size. For effecting this adjustment of the weight various means may be employed. I prefer, however, to avail of the evener mechanism for the purpose and to so connect it with the counterbalancing-weight P that when this and the other trumpet are moved in either direction from their normal positions and the speed of the back drawing-rolls varied with respect to the speed of the front drawing-rolls through the mechanism above described the counterbalancing-weight will be simultaneously adjusted to increase or diminish the tendency of the trumpets to return to their normal positions, according as the material passing through the machine is above or below the required size and weight. To permit of this automatic adjustment of the counterbalancing-weight P by the evener mechanism, I make use of an adjusting-screw O, which, threaded in the weight P and journaled in suitable bearings $p$, formed on the arm P', is provided at its front end with a bevel-gear $p'$, that intermeshes with a corresponding bevel-gear $p^2$, secured to the upper end of a shaft $p^3$, which, rotatably mounted in suitable bearings supported from the main housing or other convenient parts of the machine, is equipped at its lower end with a spur-gear $p^4$, that intermeshes with the teeth in the spur-gear H', as shown. By this arrangement, as will be seen, when the trumpets are forced from their normal positions by any increased friction of the material within either of them and the speed of the back drawing-rolls decreased with respect to the speed of the front drawing-rolls through the operation of the evener mechanism to increase the draft of the same the adjusting-screw will be turned by the connections described in a direction to force the weight P along its supporting-arm away from the shaft $n$, the result of which will be to increase the leverage of this weight upon the trumpets, and thereby increase the tendency of the latter to return toward their normal positions. On the other hand, when the trumpets are moved in the opposite direction in consequence of a decrease in the friction of the material in them and the speed of the back drawing-rolls increased with respect to the speed of the front drawing-rolls through the operation of the evener mechanism aforesaid then this weight will be moved along the supporting-arm toward the shaft and the return of the trumpets to their normal positions by the material passing through them more easily effected. Thus, as will be seen, the trumpets are made to determine whether the sliver produced is of the required size and if above or below the same to so control the speed of the back drawing-rolls with respect to the speed of the front drawing-rolls as to restore it thereto, and this, too, whether the variations in the size of the material delivered to the machine are large or small or are of extended or restricted lengths. While the relative speed of the back drawing-rolls with respect to the speed of the front drawing-rolls is thus controlled from the trumpets M and N, the changes in this relative speed to meet the requirements of the material passing through the machine are effected by shifting the belt G in one or the other directions along the drums E and F through the medium of the shifter G' and its operating devices. In order, therefore, to insure of a uniform working tension upon this belt, no matter to which position it may be shifted along the drums or how much it may be stretched, the bearings $e$, in which the drum E is journaled, instead of being secured to some stationary part of the machine are formed in the upper ends of the upwardly-extending arms $e^4$, that are fixedly secured to and extend upwardly from a transversely-arranged shaft $e^5$, which supports the gear $e^2$ and is journaled at its ends in the end frames or standards A A'. As thus supported these bearings, with their carrying-arms and the drum E, are capable of a swinging movement toward and away from the drum F, but are normally held in positions as remote therefrom as the length of the belt G will permit. For holding them in these positions I make use of a shaft $e^6$, which is journaled in the end frame or standards A A' and is provided near one of its ends with a drum $e^7$, to which are fixedly secured the upper ends of two chains $e^8$ and $e^9$, that extend wholly or partially around its periphery in opposite directions and are respectively connected at their lower ends with a weight $e^{10}$ and with the free end of an arm $e^{11}$, that is rigidly secured to and extends outwardly longitudinally from the shaft $e'$. The parts being connected and thus described, the drum E, with its supporting-arms and bearings, as will be seen, is forced outwardly away from the drum F at all times by the weight $e^{10}$ and a constant and uniform tension thereby imparted to the belt in whatever position it may occupy along the drums. While thus a uniform tension may be imparted to the belt G, it frequently happens that a change in the gear $e^3$ becomes necessary and another of a larger or smaller diameter substituted in place thereof. To permit of this being accomplished and the intermeshing of the new gear with the gear $e^2$ insured, the upwardly-extending arms $e^4$, in which it is supported upon the axis of the drum E, instead of being constructed as integral wholes are severally composed of upper and under sections, which are respectively secured together by screws $e^{12}$, that extend through suitable slots formed in the lower portions of the upper sections and engaged with suitable threaded orifices provided for them in the under sections, as shown. By this construction the lengthening or shortening of the arms may be effected and the proper adjustment thereof to suit them to the requirements of the new gear accomplished by simply loosening the screws $e^{12}$, then sliding the upper upon the under sections until the required length is attained, and then firmly securing them together by tightening the screws.

The parts being constructed and organized as above described, the material to be treated may, if so desired, be supplied to the machine in the form of a continuous mass from a number of cards, in which case it may pass directly from the railway-belt to the rear trumpet, with only such intervening supporting devices as may be required. I prefer, however, to supply it thereto in the form of a number of individual slivers $q$ $q'$ $q^2$ $q^3$, &c., which will be contained in appropriate cans Q Q' $Q^2$ $Q^3$, &c., and to conduct them to the rear trumpet N through the intervention of appropriate guides $q^4$. These guides, of which the number will correspond to that of the slivers, will be preferably formed as open top slots in the upper edge of a plate $q^5$, that is secured by appropriate screws or bolts to and is held in an upwardly and rearwardly inclined position upon a plate $q^6$, which extends across from the stand B' to the stand $B^2$ and is secured to and extends backward from the rearwardly-inclined upper edges thereof by bolts $q^7$. As thus disposed the individual slivers pass from their appropriate cans upwardly through their respective guides $q^4$ and thence forward through the rear trumpet N to the drawing-rolls, where they are drawn and attenuated. In order, therefore, to provide for this drawing and attenuating action, the rear pairs of drawing-rolls $b^2$ $b^3$ $b^4$ are appropriately connected and, with the front pair of drawing-rolls $b'$, caused to rotate at a progressively-increasing rate of speed from the rear to the front pair thereof. To this end the under roll of the pair $b^2$ is connected with the under roll of the pair $b^4$ through the intermediary of a gear $b^{16}$, which, rotatively mounted upon a shaft $b^{17}$, that is secured in a support $b^{18}$, intermeshes with a gear $b^{19}$ on the former roll and with a gear $b^{20}$ on the latter, while the under roll of the pair $b^3$ is in like manner connected with the under roll of the pair $b^4$ through the instrumentality of a gear $b^{21}$, which, rotatively mounted upon a stud $b^{22}$, that is secured in a similar support $b^{23}$, intermeshes with gears $b^{24}$ and $b^{25}$, with which the last-mentioned rolls are respectively provided. As thus connected the requisite progressively-increasing speeds of rotation are imparted to the pairs of rolls $b^3$ and $b^2$ from the back pair of drawing-rolls $b^4$, which, as before explained, is rotated from the upright shaft $f^2$ through the intervention of the bevel-gears $f^3$ and $f^4$, and in order to provide for the changing of the gears on the rolls $b^2$ and $b^3$ without destroying their connection with the rolls $b^4$ the supports $b^{18}$ and $b^{23}$, in which the studs $b^{17}$ and $b^{22}$ are respectively secured, are adjustably supported upon stands $b^{26}$, that extend upward from the plate or top B or other convenient part, whereby to permit of the engagement of these gears $b^{16}$ and $b^{21}$ with their coöperating gears on the rolls, no matter of what size these latter gears may be. From the back drawing-rolls as thus connected the material passes to the front drawing-rolls $b'$, where it is still further drawn and attenuated, and thence forward through the front trumpet M to and between the calender-rolls, whence it is discharged into a suitable can $Q^5$ or other appropriate receptacle as the completed sliver. For delivering this completed sliver from the calender-rolls to the can and properly disposing it therein I make use of a coiler R, which is constructed in circular form with a truncated conical upper portion and is provided with a passage-way $r$ for the sliver, that extends downward and outward from the center of its upper portion to a point near the periphery of its lower side, as shown by dotted lines in Fig. 1. As thus constructed the coiler is supported in a suitable seat $r'$, which is formed in the upper side of a bracket or plate R', that extends outward from the table or top B, with the upper portion of the coiler disposed in close relationship to the bottom calender-roll $b^9$. With the coiler arranged as thus described the sliver passing through the calender-rolls will enter the upper end of the passage-way $r$ and traveling down through the same will be delivered to the can, in which it may be coiled as fast as deposited by imparting to the coiler a rotary motion. To permit of this rotary motion being imparted thereto, I preferably construct the lower portion of the coiler in the form of a spur-gear $r^2$ and employ in connection therewith a spur-gear $r^3$, that is secured to the upright shaft D and intermeshes with an intermediate spur-gear $r^4$, which, rotatively mounted upon a stud $r^5$, extending upwardly from the plate R', intermeshes in turn with the gear $r^2$. By this means, as will be seen, a positive rotation of the coiler about its axis is effected from the shaft D and the sliver passing therethrough carried around and properly coiled with the can. In some instances the rotary motion thus given to the coiler will be all that is desired. In others it may be preferred to supplement this motion with a rotary motion of the can, in which cases the can will be conveniently supported upon a turn-table $R^5$, which is pivoted upon a suitable stud $r^5$, that extends upward from the floor or other convenient support and is preferably rotated thereon from the main driving-shaft C. To allow of this being accomplished, I make use of the vertical shaft $R^6$, which, mounted in a suitable stand $r^7$, secured to the main housings or other convenient part, is provided at its upper end with a worm-gear $r^8$, that intermeshes with a worm $r^9$, secured to the shaft C, and at its lower end is equipped with a spur-gear $r^{10}$, that engages with a similar spur-gear $r^{11}$, secured to the turn-table $R^5$, through the intervention of a third spur-gear $r^{12}$, which is likewise supported upon a stud $r^{13}$, extending upward from the floor or other support. As thus connected a positive rotation is imparted to the can and the sliver delivered by the calender-rolls appropriately coiled therein by the conjoint action of the coiler and can.

When the material to be treated is supplied to the machine in the form of individual slivers, I preferably employ a stopping mechanism whereby to automatically arrest the motions of the machine when one or more of these slivers fails or fail or becomes or become broken, and this will now be described.

Pivoted to the end frame or standard A upon stands $a'$ is a shipper-lever S, which is provided at its lower end with a belt-spanner $s$ and jointed at its upper end to a bar $s'$, that is fitted to slide in suitable bearings $s^2$ and $s^3$, secured to the rear edge of the plate or top B, and communicates the required motion to the lever S to ship the belt from the fast pulley $c$ to the loose pulley $c'$ when required, and vice versa. To the outside of this bar as thus disposed is pivoted a latch $s^4$, which extends through the bearings $s^2$ and is provided on its under side with a hook or overhanging portion $s^5$ for engaging therewith, while coöperating with this latch and sliding bar is a coiled or other appropriate form of spring $s^6$, which is connected at one of its ends with the latch $s^4$ through an appropriate hook $s^7$ and at its other with some stationary part of the machine—as, for instance, with the bearing $s^3$. With the parts arranged as thus described when the latch $s^4$ is engaged with the bearings $s^2$ the bar $s'$ through the shipper-lever will hold the driving-belt upon the fast pulley $c$. On the other hand, when the latch is raised so as to disengage its hook or overhanging portion from the bearing, then the spring $s^6$, acting by its resiliency, will draw the bar along in its bearings and through the connections described ship the belt from the fast to the loose pulley $c'$. For automatically raising this latch from engagement with the bearing $s^2$ when required I make use of the eccentric S', which is fixedly secured to the upright shaft D and communicates a longitudinal reciprocating movement back and forth to a rod $s^8$, that is pivoted at one of its ends to the eccentric-strap $s^9$, whereby to permit of a universal motion being given thereto, and is provided at its opposite end with a downwardly and rearwardly extending slot $s^{10}$, which engages with a stud $s^{11}$, secured in and projecting laterally from an arm $s^{12}$, that is fixedly secured to a shaft $s^{13}$, which is rotatively mounted in suitable bearings secured to the stands B' and B$^2$ or otherwise. With the parts connected as thus described a forward-and-backward movement will be imparted to the rod $s^8$ by the eccentric S' and a corresponding rocking motion thereby communicated to the arm $s^{12}$ as long as the movement of the shaft $s^{13}$ is unobstructed; but the instant that it is arrested, as it will be when one of the slivers $q$ $q'$ $q^2$ $q^3$, &c., breaks or otherwise fails, the further rocking of the arm $s^{12}$ will be prevented, and the rod $s^8$ in its retracting movement will compel the slot $s^{10}$ to ride upward on the stud $s^{11}$ and its own outer end to be thereby elevated, with the consequent effect of raising the outer end of the latch $s^4$ from engagement with the bearings $s^2$ and permitting of the spring $s^6$ shipping the belt from the fast pulley $c$ to the loose pulley $c'$ through the intervention of the bar $s'$ and lever S. In some instances the rod $s^8$ may in its rising movement engage directly with the latch $s^4$ without the intervention of other devices. I prefer, however, to employ an intermediate shoe or block $s^{14}$ for that purpose, which is preferably secured to the rod $s^8$ in proper relationship to the latch, whereby when the riding of the slot $s^{10}$ upward upon the stud $s^{11}$ occurs the shoe will be brought into contact with the latch, and the same thereby raised. Thus through the mechanism described the automatic shipping of the belt from the fast to the loose pulley is effected, as will be seen, by simply arresting the movement of the shaft $s^{13}$. In order, therefore, to accomplish this result when one or more of the slivers supplied to the machine breaks or break or otherwise fails or fail, I make use of the "spoon-levers" $q^8$ $q^9$ $q^{10}$ $q^{11}$, &c., which, fulcrumed upon a knife-edge support $q^{12}$, extending across from the stand B' to the stand B$^2$ and secured therein, coöperate with an upwardly-extending web or bar $q^*$, that is fixedly secured to the shaft $s^{13}$, whereby to vibrate back and forth therewith.
These levers, of which there will be one for each of the slivers supplied to the machine, are severally constructed with longitudinally-extending channels $q^{14}$ of circular cross-section in the upper surface of their forward ends and with downwardly-extending lugs $q^{15}$ on the under side of their opposite ends for engagement with the web or bar $q^*$ when brought in contact therewith. As thus constructed and arranged the slivers $q$ $q'$ $q^2$ $q^3$, &c., in traveling forward from their containing-cans Q Q' Q$^2$ Q$^3$, &c., through their guides $q^4$ to the rear trumpet N pass over these levers and, resting in the channels $q^{14}$ thereof, depress by their weight the forward ends of the levers, and thereby hold the lugs $q^{15}$ on their rear ends elevated above the movements of the web or bar, which is then left free to vibrate back and forth thereunder with its carrying-shaft $s^{13}$. In those positions these levers will be held so long as the respective slivers passing over them are intact; but immediately one of the slivers breaks or otherwise fails the rear end of its respective lever, in consequence of its greater preponderance, will drop and engage the lug $q^{15}$ on its under side with the web or bar $q^*$, thereby arresting the movement of the shaft $s^{13}$, and through it and the mechanism described disengaging the latch $s^4$ from the bearing $s^2$ and stopping the machine. While thus the automatic stopping of the machine is effected by the breaking or failure of one or more of the slivers, the maintenance of the forward ends of the levers $q^8$ $q^9$ $q^{10}$ $q^{11}$, &c., in depressed positions when their respective slivers are intact is more efficiently accomplished by so directing the slivers thereto and conducting them therefrom that the slivers are caused to act thereon not only by their gravity, but also by a downward strain as they are drawn over them. To this end the "arrow-head-shaped" guides $q^{16}$ and tension-roll $q^{17}$ are employed. Of these the arrow-head-shaped guides are arranged in rear of the levers and slightly in front of the guides $q^4$, in which position they are preferably secured to the upper side of the plate $q^6$ by appropriate screws with the overhanging portion on each side of their supporting-stems extended across the guides $q^4$ adjacent thereto, while the tension-roll $q^{17}$ is arranged in front of these levers, being preferably journaled in an inverted-U-shaped frame $q^{18}$, which is pivoted to the upper portion of a hanger $q^{19}$, that is adjustably secured to the stand $B^7$ by an appropriate bolt $q^{20}$. As thus arranged the under operative surfaces of the arrow-head-shaped guides and tension-roll are somewhat lower than that of the forward end of the levers, respectively, in consequence of which the slivers in traveling from the guides $q^4$ to the trumpet N are caused to incline upward slightly toward these lever ends after passing around the lower edges of the arrow-head-shaped guides and thence downward to the under surface of the tension-roll, whereby not only is an even and uniform tension imparted to the slivers, whether the cams from which they are supplied are full or nearly empty, but a downward pressure exerted upon the forward ends of those levers in addition to that exerted upon them by the gravity of the slivers themselves. In its normal position, as when the slivers are all passing to the trumpet N, the tension-roll $q^{17}$ will rest upon them in a horizontal position, as shown in Figs. 1, 5, and 11. On the other hand, when one or more of the slivers is or are broken and it is desired to mend or "piece up" the same then the tension-roll will be raised into a vertical position, and in order to limit its movement in that direction and support it in a horizontal position when turned down into it the frame $q^{18}$ is provided with a laterally-extending lug $q^{21}$, which coöperates with corresponding lugs or stops $q^{22}$ and $q^{23}$, formed on the hanger $q^{19}$, as shown. From the tension-roll $q^{17}$ the several slivers pass to the trumpet N, and with a view to bringing them together and partially consolidating them before passing thereto the guide $q^{24}$ is made use of, which, preferably constructed of an open elliptical form, is supported intermediate the tension-roll and the trumpet upon a plate $q^{25}$, in which it is threaded, whereby to render it vertically adjustable thereon.

With the mechanism employed for arresting the movement of the machine when one or more of the slivers supplied thereto breaks or break or otherwise fails or fail there is also employed means for arresting its movements when the receiving-can $Q^5$ is filled with sliver beyond a certain limit or when the sliver in traveling from the calender-rolls to the receiving-can fails to pass through the passage-way $r$ in the coiler R. In these means a rock-shaft T is made use of, which, pivoted on centers $t$ adjustably supported from any convenient part of the machine, is provided with laterally-extending arms $t^2$ and $t^3$. Of these the arm $t^2$ is constructed with a laterally-extending angular portion $t^4$, which rests at its outer extremity upon the upper surface of the coiler and is provided at that point with an upwardly-inclined lip $t^5$, that extends inwardly therefrom and is disposed in close relationship to the passage-way $r$ on one side thereof. The arm $t^3$ on the other hand is provided at its outer free end with an adjusting-screw $t^6$, which rests upon the free end of an arm $t^7$, formed on or fixedly secured to a second rock-shaft $t^8$, that is preferably disposed at right angles to the shaft T, and, pivoted in like manner upon suitable centers $t^9$, adjustably supported from any convenient part of the machine, is also provided with a rearwardly-extending arm $t^{10}$, which is adapted to coöperate with a downwardly-extending arm $t^{11}$, fixedly secured to the shaft $s^{13}$ and provided at its lower end with the forwardly-extending horizontal lip $t^{12}$. As thus organized and arranged when the coiler is in its normal position and the sliver is properly passing from the calender-rolls to the can through the passage-way $r$ the free end of the arm $t^{10}$ will be held above the path of travel of the lip $t^{12}$ of the arm $t^{11}$ by the weight of the arms $t^2$ and $t^3$ upon the arm $t^7$, and the arm $t^{11}$ thereby left free to vibrate back and forth with the shaft $s^{13}$ as it is oscillated from the eccentric S' through the connecting devices. On the other hand, when the sliver passing to the can $Q^5$ rises therein above a certain limit or when the sliver delivered by the calender-rolls fails to enter the passage-way $r$ and is carried around on the upper surface of the coiler it will in the former case raise the coiler from its seat by its contact with the under side thereof and in the latter be carried beneath the upwardly-inclined lip $t^5$ in a snarled condition, thereby raising in either case the free ends of the levers $t^2$ and $t^3$ and allowing the arm $t^{10}$ to swing downward by its preponderance and engage with the horizontally-extending lip $t^{12}$ of the arm $t^{11}$. As a result of this the movement of the shaft $s^{13}$ will be arrested and the rear end of the connecting-rod $s^8$ through its pin-and-slot connection with the arm $s^{12}$ thereby caused to rise and release the latch $s^4$ from engagement with the bearing $s^2$, with the effect of allowing the spring $s^6$ to ship the belt from the fast to the loose pulley through the bar $s'$ and shipper-lever S and stop the further movements of the machine. Thus the stopping of the machine will be effected through the mechanism described whenever the free end of the arm $t^2$ is raised by the action of the sliver either upon the bottom of the coiler in an overfilled can or upon the under side of the upwardly-inclined lip $t^5$ in passing under it, and in order to limit the downward movement of the arm $t^{10}$ when the free ends of the arms $t^2$ and $t^3$ are thus raised and their weight thereby removed from the arm $t^7$ not only is the free end of the arm $t^{10}$ provided with an overhanging lip $t^{13}$ for resting upon and coöperating with the lip $t^{12}$, but the shaft $t^8$ is likewise provided with a downwardly-extending arm $t^{14}$, which contacts with the rear edge of the plate or top B or other convenient part when the arm $t^{10}$ is tilted downward below a certain limit through the medium of an adjustable screw $t^{15}$, that passes through its lower end. In like manner the stopping of the machine may be effected whenever the sliver either becomes reduced in size below a certain limit or breaks between the trumpet M and the calender-rolls or whenever in the operation of the machine it winds around the bottom of these calender-rolls. To this end the trumpet M instead of being fixedly secured to its supporting-shaft $n$ is pivotally secured thereto through the intervention of the lugs $n^9$ and $n^{10}$ and is provided with a rearwardly-extending arm $n^{17}$, upon which is secured a weight $n^{18}$ and a forwardly and laterally extending angular arm $n^{19}$. As thus mounted and equipped the trumpet is capable of a backward and forward swinging movement from and toward the calender-rolls upon such shaft independently thereof, being limited in its movements in these respective directions by stops $n^{20}$ and $n^{21}$, of which the former is secured to and extends upward from the shaft $n$ for contact with the arm $n^{17}$, while the latter is secured to and extends downward from the shank of the trumpet for contact with the shaft $n$. When the sliver passing through the trumpet is of the standard size and weight, the delivery end of the latter will be slightly in rear of the bight of the top and bottom calender-rolls, with the stop $n^{21}$ firmly seated against the shaft $n$, in which positions the parts will be held by the conjoint action of the sliver and the counterbalancing-weight P so long as that size and weight are maintained, and any attempt of the sliver to wind around the bottom calender-roll $b^9$ when the trumpet is in this position will be prevented by the laterally-extending portion of the arm $n^{19}$, which, lying in close relationship to the surface of such roll, will scrape it therefrom and cause it to fall upon the top of the coiler, by which it will be carried around under the upwardly-inclined lip $t^5$, raising the free end of the arm $t^2$ thereby and through it and the mechanism above described arresting the movements of the machine. On the other hand, when the sliver delivered to the trumpet becomes reduced from any cause below the standard size to any considerable extent or breaks between the delivery end of the trumpet and the calender-rolls or when the sliver winds around the bottom calender-roll $b^9$ instead of passing through the passage-way $r$ to the receiving-can, as it may sometimes do when the trumpet is tilted backward slightly from its normal position, then in the first two cases by the action of the weight $n^{18}$ and in the last case by the action of the sliver upon the laterally-extending portion of the arm $n^{19}$ the trumpet M will be swung backward upon its supporting-shaft $n$, thereby raising the free end of the arm $t^2$ by the downwardly-extending lug $n^{22}$ on the arm $n^{19}$ engaging with its underturned portion the adjusting-screw $n^{23}$ in the end of the arm $t^2$ and by this action stopping the further movements of the machine through the mechanism previously described. The stopping of the machine being thus effected by the backward movement of the trumpet M when any one of these events occurs, the further stopping of the same is likewise accomplished when a bunch formed in the sliver by imperfect piecing of the ends or otherwise chokes such trumpet in passing through the machine and tilts it in a forward direction. To permit of this being accomplished, the shaft $n$ is provided with an arm $n^{24}$, which engages at its outer free end with the lower extremity of a screw $n^{25}$, extending downward through an arm $n^{26}$, that is fixedly secured to and projects from the shaft T, whereby when the trumpet is swung forward beyond a certain limit with its supporting-shaft $n$ this arm $n^{24}$ will raise the free end of the arm $n^{26}$ and through the shaft T and coöperating means cause the shipping of the belt from the fast to the loose pulley and the stopping of the machine. The movements of the trumpet to effect the evening of the material when the machine is in normal operation, however, being limited by the stops $n^{14}$ and $n^{15}$ will not be sufficient to enable the arm $n^{24}$ to raise the arm $n^{26}$ to the requisite height to effect the stoppage of the machine when it is thus operating. In order, therefore, to allow of a sufficient movement of the parts to accomplish that result, when the sliver in passing through the trumpet clogs therein and draws the latter forward by the strain exerted upon the former by the calender-rolls the stop $n^{14}$, instead of being fixedly held in place, is capable of a yielding action when the strain thereon exceeds a certain limit and the trumpet, with its supporting-shaft and the rear trumpet, thereby allowed to oscillate in a forward direction to a greater limit. To this end the stop is preferably constructed in the form of a plunger, which is fitted to slide in a suitably-formed stand $n^{27}$ and, provided with a collar $n^{28}$, fast thereon, is normally held pressed forward toward the stop $n^{15}$ by a coiled spring $n^{29}$, which bears at one end against the collar $n^{28}$ and at its other against a screw-plug $n^{30}$, threaded into the rear end of the stand $n^{27}$, whereby the tension of the spring may be regulated. As thus constructed the spring $n^{29}$ will be of sufficient tension to hold the stop $n^{14}$ firmly in place against any strain that may be imparted thereto from the trumpets M and N by the material in normally passing therethrough, and thereby limit the movements of the shaft $n$ to such an extent that when the arm $n^{16}$ is carried forward against such stop the arm $n^{26}$ will not be raised to a sufficient height by the arm $n^{24}$ to effect the stopping of the machine. On the other hand, when the sliver clogs in the trumpet and the latter is drawn forward by the extraordinary strain imparted to the former by the action of the calender-rolls upon its projecting end then the stop $n^{14}$ and its spring will yield thereto and the shaft $n$ thereby allowed to rotate upon its centers until the arm $n^{26}$ is raised by the arm $n^{24}$ to the requisite height to permit of the arm $t^{10}$ engaging with the lip $t^{12}$ on the arm $t^{11}$, when the stopping of the machine will be effected, and thus through the single rock-shaft T and the mechanism coöperating therewith the automatic stopping of the machine will be effected whenever the free end of the arm $t^2$ is swung upward to the proper extent by the happening of any one of the six occurrences last specified.

With the parts above described are also employed means whereby the movements of the ratchet-wheel H are arrested when the shifter G' is moved along the drums E and F in either direction beyond certain limits. These means preferably consist of the lifting-plates $k^6$ and $k^7$, which are severally arranged above the pawls $k$ $k$ and coöperate therewith through the intervention of upwardly and rearwardly extending arms $k^8$ and $k^9$, with which these pawls are respectively provided. As thus arranged these lifting-plates are formed on or secured to the free ends of levers $k^{10}$ and $k^{11}$, which are fulcrumed at their opposite ends upon a shaft $k^{12}$, that is supported from the end frame or standard A through the intervention of hangers $k^{13}$. In their normal positions, as when the shifter G' is removed from the limits of its travel, these lifting-plates are held in horizontal relationship above their respective pawls, which are then free to move back and forth thereunder without interference from them. On the other hand, when the shifter G' has been carried beyond certain limits in either direction then the pawl $k$ that was operative to effect that movement will be raised from engagement with the teeth $h$ of the ratchet-wheel H by the descent of the appropriate lifting-plate $k^6$ or $k^7$ upon the upwardly and rearwardly extending arm thereof and the further movement of the shifter thereby arrested. For supporting these lifting-plates in their normal position above the pawls while yet permitting of one or the other of them descending upon the arms $k^8$ or $k^9$, as the requirements of the machine may demand, the shaft $k^{14}$ is employed, which, rotatively mounted in suitable hangers $k^{15}$, that are fixedly secured to the upper side of the shield or deck I, is constructed with the reversely-arranged crank-like portions $k^{16}$ and $k^{17}$, upon which the levers $k^{10}$ and $k^{11}$ respectively rest through the intervention of adjusting-screws $k^{18}$. As thus constructed when the lifting-plates $k^6$ and $k^7$ are in their normal positions the shaft $k^{14}$ will be held with the crank-like portions $k^{16}$ and $k^{17}$ disposed in approximately a horizontal plane. On the other hand, when the lowering of one or the other of these plates is required to effect the raising of its respective pawl from engagement with the ratchet-teeth $h$ then the swinging downward of the crank-like portion of the shaft appropriate thereto will be necessary, and this will be accomplished by oscillating the shaft in the required direction. For effecting this oscillation of the shaft various means may be employed. I prefer, however, to effect it from the shifter G', and to that end make use of the rod $k^{19}$, which, extended through a suitable orifice $k^{20}$, formed in a lug $k^{21}$, extending backward from the shifter G' and provided with suitable collars $k^{22}$ and $k^{23}$, is fitted to slide at one of its ends in a suitable hanger $k^{24}$, depending from the under side of the shield or deck I, and is jointed at its other to the free end of an arm $k^{25}$, which is fixedly secured to the shaft $k^{14}$. As thus arranged and connected whenever the shifter G' is moved beyond certain limits in either direction its rearwardly-extending lug $k^{21}$ will contact with one or the other of the collars $k^{22}$ or $k^{23}$, carrying with it the rod $k^{19}$ and through the arm $k^{25}$ oscillating the shaft $k^{14}$ in the required direction, with the consequent effect of lowering the lifting-plate $k^6$ or $k^7$ upon the upwardly-extending arm $k^8$ or $k^9$ of the pawl that is then acting, removing such pawl from engagement with the teeth $h$ of the ratchet-wheel H, and thereby arresting the further movement of the shifter G'. In these positions the parts will remain until the shifter G' is removed from contact with the collar, when the shaft $k^{14}$, with the lifting-plate $k^6$ or $k^7$ and its respective lever, will be returned to its normal position ready for the next operation. For returning these parts to their normal positions when relieved from the action of the shifter the lever $k^{26}$ is employed, which, fulcrumed at one of its ends upon the shaft $k^{12}$, is provided with the adjusting-screws $k^{27}$ and $k^{28}$, that respectively rest upon the oppositely-arranged arms $k^{29}$ and $k^{30}$, which are fixedly secured to the shaft $k^{14}$, with their upper surfaces in approximately parallel relationship to the under surface of the lever, as shown. With the lever arranged as thus described whenever the shaft $k^{14}$ is oscillated in one or the other direction by the action of the shifter G' against one or the other of the collars $k^{22}$ or $k^{23}$ the arm $k^{29}$ or $k^{30}$ answering thereto will be swung upward, swinging upwardly with it the lever $k^{26}$ on its fulcrum and holding it in a raised position until the shifter is removed from the collar, when the lever by its gravity will react upon the arm, and thereby force the parts back to their normal positions. While the lever $k^{26}$ thus serves to restore the shaft $k^{14}$ and the parts coöperating therewith to their normal positions when removed therefrom, it also serves to arrest the movements of the machine when the removal of this shaft with its coöperating parts from their normal positions is effected. To this end the vertical rod $k^{31}$ is provided, which rests at its lower end in a suitable socket $k^{32}$, formed in the free extremity of the lever $k^{26}$, and, extending upward therefrom to a point slightly below the under edge of the latch $s^4$, is held in that position by a bearing or sleeve $k^{33}$, secured to the top B or other convenient part. The vertical rod being thus arranged will whenever the lever $k^{26}$ is swung upward upon its fulcrum by the action of either of the arms $k^{29}$ or $k^{30}$ be carried upward thereby and, contacting with the latch $s^4$, will force it upward from engagement with the bearing $s^2$ and allow of the shipping of the belt from the fast to the loose pulley and the stopping of the machine by the spring $s^6$ through the bar $s'$ and lever S, as before explained. It will thus be seen that through the shaft $k^{14}$ and the parts coöperating therewith not only is the operative pawl removed from engagement with the ratchet-teeth $h$, but the stopping of the machine effected whenever the shifter G' in its operation is carried beyond certain limits in either direction.

While the stopping of the machine as thus far described has been automatically effected, it is found desirable in practice to employ means whereby that result may be accomplished by hand. For this purpose the shipper-shaft V is made use of, which, journaled in suitable bearings $v$, secured to the end frame A or other convenient part and provided with the upwardly-extending handles $v'$, is equipped with an arm $v^2$, that is jointed at its lower end to the bar $s'$, as shown. By these means, as will be seen, the stopping of the machine may be accomplished whenever desired by simply oscillating the shaft V in the required direction through the handles $v'$, and in order to allow of this being accomplished when the latch $s^4$ is engaged with the bearing $s^2$ the pivoting of the latch to the bar $s'$ is by a pin-and-slot connection, of which the slot is made of a sufficient length to permit of the requisite movement of the bar without disturbing the latch.

From the foregoing it will be seen that I provide a machine in which not only is the movement of the evener-mechanism ratchet-wheel arrested and the automatic stopping of the machine effected whenever the evener-belt shifter is traversed beyond certain limits in either direction, but the automatic stopping of the same also accomplished whenever one or more of the slivers supplied to it breaks or break or otherwise fails or fail, whenever the sliver-receiving can is filled beyond a certain limit, whenever the sliver in passing from the calender-rolls fails to travel through the passage-way in the coiler and is carried around on the top of the coiler, whenever the sliver breaks between the front trumpet and the calender-rolls, whenever the sliver in passing from the calender-rolls winds around the bottom roll thereof, whenever the sliver is reduced below a given limit, whenever the front trumpet becomes choked by a bunch or otherwise, or whenever any one or more of the slivers supplied to the machine breaks or break or otherwise fails or fail.

Wherever in the foregoing description the words "front" and "rear" have been employed it is to be understood that they have been used in the sense that the material to be treated enters the machine at its rear and the completed sliver leaves it at the front.

While in the foregoing I have described what I consider the best embodiment of my invention, it is to be understood that I do not restrict myself thereto, but reserve the right to modify the same in various ways and still be within the scope thereof. Again, while in the foregoing I have described my invention as applied to a machine of the railway-head class it is to be understood that many of the features thereof are applicable to drawing-frames and other forms of machine employed in the transformation of cotton fiber into yarn, and in practice I contemplate so employing them.

Having now described my invention and specified certain of the ways in which it is or may be carried into effect, I claim and desire to secure by Letters Patent of the United States—

1. The combination, with the guides through which the material is supplied to the machine, and the rear trumpet, of the arrow-head-shaped guides arranged in front of the first-mentioned guides, whereby to impart to the material passing through the machine an appropriate tension, substantially as described.

2. The combination, with the guides through which the material is supplied to the machine, the rear trumpet, and the arrow-head-shaped guides, of the spoon-levers over which such material passes, pivoted in front of the first-mentioned guides, and a tension-roll arranged in front of these spoon-levers, whereby the material in passing through the machine is caused to incline upward slightly from the arrow-head-shaped guides to the forward ends of the spoon-levers and thence downward slightly to the tension-roll before entering the rear trumpet, substantially as described.

3. The combination, with the guides $q^4$ through which the material is supplied to the machine, and the rear trumpet, of the spoon-levers, a tension-roll arranged in front of these levers, and a guide disposed in front of the tension-roll for partially consolidating the material before entering the rear trumpet, substantially as described.

4. The combination, with the tension-roll, and one of the drawing-roll stands, of a frame in which the tension-roll is mounted, a hanger to which the tension-roll-supporting frame is jointed at one of its ends, and means for controlling the swinging movements of this frame, whereby the tension-roll may be held in proper operative position over the material being treated, and not only swung upwardly and away from over the same when the piecing or mending of an end is required, but held in that position during that operation, substantially as described.

5. The combination, with the evener-mechanism ratchet-wheel, the pawls for coöperating therewith provided with upwardly and rearwardly extending arms, means by which the pawls are reciprocated, and the evener-mechanism belt-shifter, of lifting-plates for coöperating with such pawls, and connecting devices intermediate the belt-shifter and the lifting-plates, whereby, when the shifter is moved beyond certain limits in either direction, the pawl which effects the movement is removed from operative connection with the ratchet-wheel, by the descent of its respective lifting-plate upon its upwardly and rearwardly extending arms, and is returned into operative connection therewith, when the shifter is moved in an opposite direction, by such lifting-plate being raised from said arms, substantially as described.

6. The combination, with the evener-mechanism ratchet-wheel, the pawls for coöperating therewith provided with upwardly and rearwardly extending arms, means by which the pawls are reciprocated, the evener-mechanism belt-shifter, and a stopping mechanism, of lifting-plates for coöperating with such pawls, and connecting devices intermediate the shifter and the lifting-plate and the shifter and stopping mechanism, whereby, when the shifter is moved beyond certain limits in either direction, the pawl which effects the movement is removed from operative connection with the ratchet-wheel by the descent of its respective lifting-plate upon its upwardly and rearwardly extending arm, and the stopping of the parts effected, substantially as described.

7. The combination, with the ratchet-wheel H provided with the ratchet-teeth $h$, the pawls $k\ k$ provided with upwardly and rearwardly extending arms, the lifting-plates $k^6$ and $k^7$, the levers $k^{10}$ and $k^{11}$ by which the lifting-plates are respectively carried, the belt-shifter G' provided with the rearwardly-extending lug $k^{21}$ and the means by which it is moved back and forth along its guide-rods, of the shaft $k^{14}$ provided with the oppositely-arranged crank-like portions $k^{16}$ and $k^{17}$ upon which the levers $k^{10}$ and $k^{11}$ respectively rest, the arm $k^{25}$ fixedly secured to such shaft, and the rod $k^{19}$ provided with the collars $k^{22}$ and $k^{23}$, with which the backwardly-extending lug $k^{21}$ is adapted to contact, substantially as described.

8. The combination, with the pawls $k\ k$, the lifting-plates $k^6$ and $k^7$, the levers $k^{10}$ and $k^{11}$ by which the lifting-plates are respectively carried, the shaft $k^{14}$ provided with the oppositely-arranged crank-like portions $k^{16}$ and $k^{17}$, and also with the arm $k^{25}$, and the rod $k^{19}$, of the oppositely-arranged arms $k^{29}$ and $k^{30}$ fixedly secured to said shaft, and the lever $k^{26}$ resting on these arms, whereby to return the parts to their normal positions when removed therefrom, substantially as described.

9. The combination, with the shaft $k^{14}$ provided with the arms $k^{25}$, the belt-shifter G' provided with the backwardly-extending lug $k^{21}$, mechanism for moving this shifter back and forth along its guide-rods, and the rod $k^{19}$ provided with the collars $k^{22}$ and $k^{23}$, of the oppositely-arranged arms $k^{29}$ and $k^{30}$ fixedly secured to said shaft $k^{14}$, the lever $k^{26}$ resting upon such arms, the vertical rod $k^{31}$, the latch $s^4$, the bar $s'$, shipper-lever S, and the spring $s^6$, whereby the stopping of the machine is effected whenever the shifter G' is moved beyond certain limits in either direction, substantially as described.

10. The combination, with the rock-shaft T, the rock-shaft $s^{13}$, and the belt-shipping devices, of mechanism intermediate the rock-shaft T and the rock-shaft $s^{13}$ and intermediate the latter rock-shaft and the belt-shipping devices, whereby when the oscillation of the rock-shaft $s^{13}$ is arrested by the rotation of the rock-shaft T around its axis, the shipping of the belt from the fast to the loose pulley and the stopping of the machine are automatically effected, substantially as described.

11. The combination, with the coiler, and the belt-shipping devices, of the rock-shaft T provided with an arm that rests at its free end upon the coiler, and connecting devices intermediate the rock-shaft and the belt-shipping devices, whereby when the coiler is raised from its seat by the pressure of the sliver against its under surface or otherwise, and the rock-shaft oscillated therefrom through its arm, the shipping of the belt from the fast to the loose pulley and the stopping of the machine are automatically effected, substantially as described.

12. The combination, with the coiler, and the belt-shipping devices, of the rock-shaft T provided with an arm that rests upon the coiler and is equipped at its outer extremity with an upwardly-inclined lip, and connecting devices intermediate the rock-shaft and the belt-shipping devices, whereby when the free end of the said arm is raised by the passage of the sliver between it and the coiler and the rock-shaft oscillated thereby, the shipping of the belt from the fast to the loose pulley and the consequent stopping of the machine are automatically effected, substantially as described.

13. The combination, with the rock-shaft T, provided with an arm, of the front trumpet provided with a weighted arm and an underturned lug for engaging with the free end of the first-mentioned arm, and the trumpet-supporting shaft to which the trumpet is jointed, whereby when the sliver supplied to the trumpet is reduced below a given size the trumpet will be swung back upon its supporting-shaft by its weighted arm and the rock-shaft thereby oscillated upon its axis by the underturned lug engaging with and raising the free end of the arm on such rock-shaft, substantially as described.

14. The combination, with the rock-shaft T provided with an arm, and the calender-rolls, of a trumpet provided with a weighted arm and an underturned lug for engaging with the free end of the arm on the rock-shaft, and the trumpet-supporting shaft to which the trumpet is jointed, whereby when the sliver breaks between the trumpet and the calender-rolls the trumpet will be swung back upon its supporting-shaft by its weighted arm and the rock-shaft thereby oscillated upon its axis by the underturned lug engaging with and raising the free end of the arm on the rock-shaft, substantially as described.

15. The combination, with the rock-shaft T provided with an arm, and the bottom calender-roll, of a trumpet provided with an underturned lug for engagement with the free end of the arm on the rock-shaft and with an arm that is equipped with a laterally-extending portion for coöperation with the bottom calender-roll, and a trumpet-supporting shaft to which the trumpet is jointed, whereby when the sliver winds around such calender-roll the trumpet will be swung back on its supporting-shaft and the rock-shaft thereby oscillated upon its axis by the underturned lug engaging with and raising the free end of the arm on the rock-shaft, substantially as described.

16. The combination, with the bottom calender-roll, and the trumpet-supporting shaft, of a trumpet carried by such shaft and provided with an arm that is equipped with a laterally-extending portion for coöperation with such calender-roll, whereby when the trumpet is in its normal position the laterally-extending portion of the arm carried thereby will prevent the winding of the sliver around said bottom calender-roll, substantially as described.

17. The combination, with the rock-shaft T provided with an arm, a trumpet-supporting shaft provided with an arm for engagement with the arm on the rock-shaft, and the calender-rolls, of a trumpet carried by such trumpet-supporting shaft, whereby when the trumpet becomes choked and is drawn forward by the calender-rolls beyond certain limits, the rock-shaft will be oscillated upon its axis by the arm on the trumpet-supporting shaft engaging with and raising the free end of the arm on the rock-shaft, substantially as described.

18. The combination, with the rock-shaft T, the belt-shipping devices and connecting mechanism intermediate the rock-shaft and the shipping devices, of a trumpet, an axis upon which it is mounted, and mechanism for connecting such trumpet with the rock-shaft, whereby when the trumpet is swung either forward or backward beyond certain limits the rock-shaft will be oscillated upon its axis, and the shipping of the belt from the fast to the loose pulley and the consequent stopping of the machine thereby automatically effected, substantially as described.

19. The combination, with the rock-shaft T, provided with an arm, the belt-shipping devices, and the connecting mechanism intermediate the rock-shaft and the shipping devices, of a trumpet, a shaft $n$ upon which it is mounted provided with an arm for engagement with the arm on the rock-shaft T, whereby when the trumpet is swung upon its axis beyond certain limits the rock-shaft will be oscillated upon its axis and the shipping of the belt from the fast to the loose pulley thereby automatically effected, substantially as described.

20. The combination, with the rock-shaft $s^{13}$ provided with the arms $s^{12}$ and $t^{11}$, the eccentric S', rod $s^8$ provided at its free end with the downwardly and rearwardly extending slot $s^{10}$, the stud $s^{11}$ with which the slot engages, the bar $s'$, the shipper-lever S, bearings $s^2$ and $s^3$, spring $s^6$, and latch $s^4$, of the rock-shaft T provided with the arm $t^3$, the rock-shaft $t^3$ provided with the arms $t^7$ and $t^{10}$, and mechanism for oscillating the rock-shaft T, whereby, when such rock-shaft T is oscillated upon its axis, the arm $t^{10}$ will be brought into engagement with the arm $t^{11}$ and the stopping of the machine thereby automatically effected, substantially as described.

21. The combination, with the trumpet-supporting shaft provided with the upwardly and rearwardly extending stop $n^{20}$, of the trumpet jointed thereto and provided with a rearwardly-extending weighted arm and with a stop $n^{21}$ for coöperating with said shaft, substantially as described.

22. The combination, with the front and back trumpets, the means by which they are connected, and the supporting-shaft for the front trumpet provided with an upwardly-extending arm $n^{16}$, the yielding stop $n^{14}$ and the fixed stop $n^{15}$, whereby, the forward and backward movements of such trumpets beyond certain limits are positively restrained, and their movements through a portion of their forward travel yieldingly resisted, substantially as described.

In witness whereof I have hereunto set my hand this 17th day of October, 1900.

ARTHUR W. MATHEWSON.

Witnesses:
GEORGE W. BELT,
W. H. PUTNAM.